F. P. DIMPFEL.
STEAM BOILER.
594. REISSUED AUG. 31, 1858.
2 SHEETS—SHEET 1.
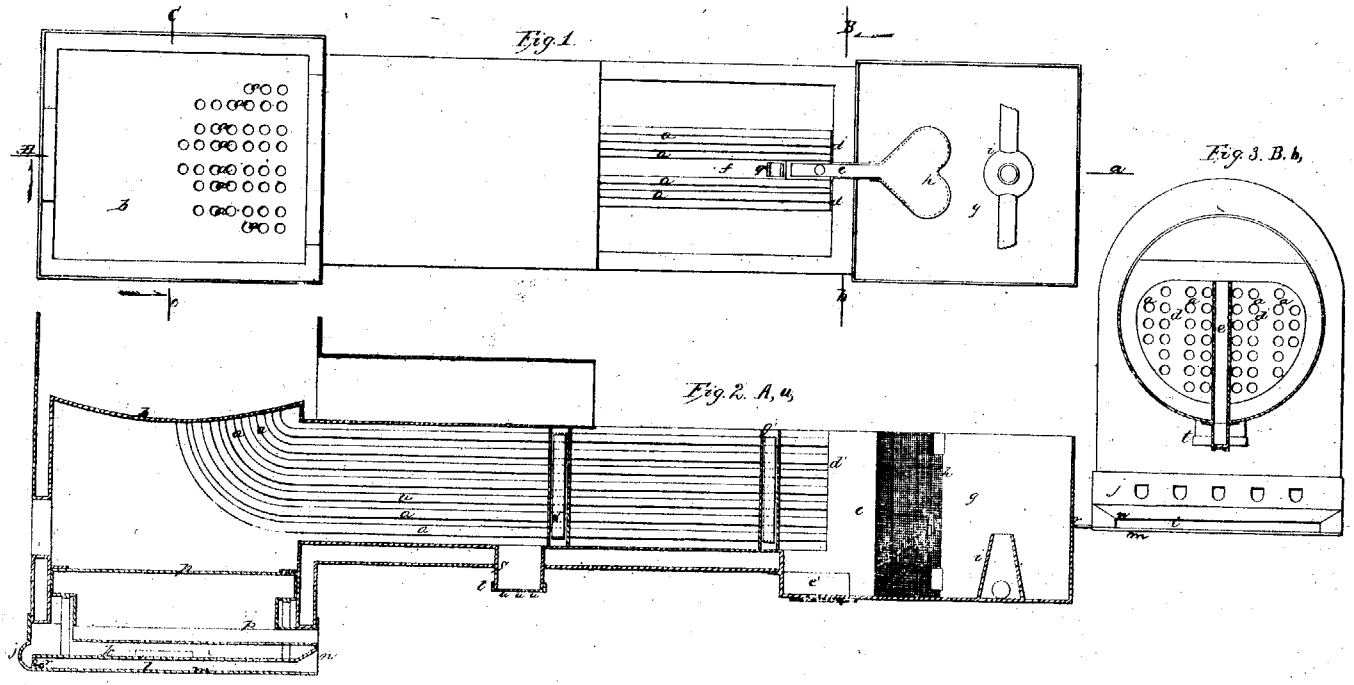
Witnesses
Jacob Kleinsmith
Ed. J. Kleinsmith
Inventor
F. P. Dimpfel F. P. DIMPFEL.
STEAM BOILER.
594.
REISSUED AUG. 31, 1858.
2 SHEETS—SHEET 2.
Fig. 4. c, c.
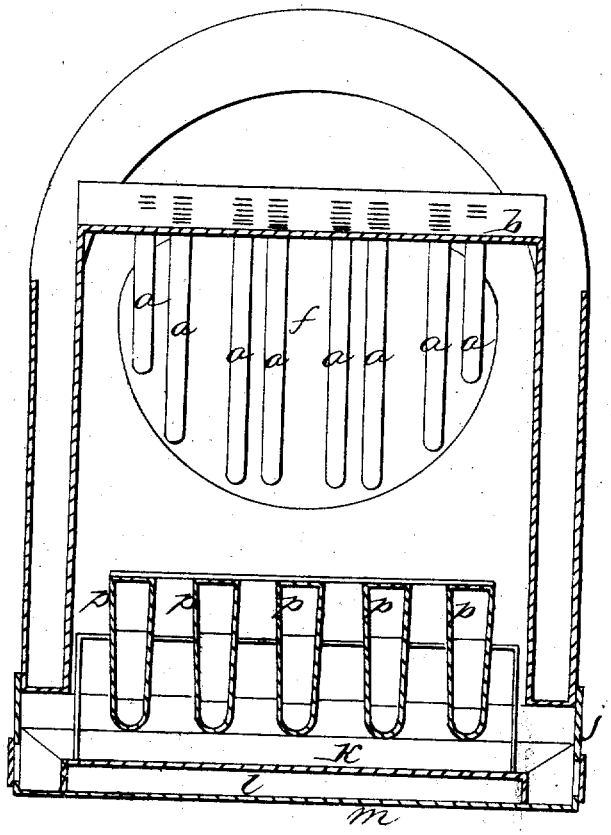
Witnesses.
Joseph Kesterbrock
Edw. J. Tuleuge
Inventor.
F. P. Dimpfel

UNITED STATES PATENT OFFICE.

F. P. DIMPFEL, OF PHILADELPHIA, PENNSYLVANIA.

IMPROVEMENT IN STEAM-BOILERS.

Specification forming Letters Patent No. 14,555, dated April 1, 1856; Reissue No. 594, dated August 31, 1858.

*To all whom it may concern:*

Be it known that I, F. P. DIMPFEL, of Philadelphia, in the State of Pennsylvania, have invented certain new and useful Improvements in Steam-Boilers and in the Furnaces thereof, of which the following is a full, clear, and exact description, reference being had to the accompanying drawings, making part of this specification, in which—

Figure 1 is a plan of my improved boiler with portions of the outer shell removed to exhibit the internal arrangements; Fig. 2, a longitudinal vertical section taken at the line A *a* of Fig. 1, and Figs. 3 and 4 cross vertical sections taken at the line B *b* and C *c* of Fig 1.

The same letters indicate like parts in all the figures.

The first part of my invention relates to a method of consuming the small particles of coal which are carried by the force of the blast from the fire-chamber into the flues, and which, if not consumed, clog the flues.

This part of my invention consists in connecting with the main flue of the boiler one or more vessels or receptacles with small apertures at or near the bottom thereof for the admission of atmospheric air, which vessel or receptacle is fitted to a hole in the bottom of the main flue back of the fire-chamber and in front of a check or deflector, or between checks and deflectors introduced in the flue. Under this connection, when the current induced by the draft or blast moves from the fire-chamber through the flue and is deflected by the check or deflector the fine particles of coal which are carried by the current are so much checked in their motion that they fall into the receptacle, and, being in a highly-heated state, the supply of atmospheric air through the small apertures at or near the bottom of the said receptacle induces combustion, which consumes them as fast as they are supplied. In this way the clogging of the flues is prevented and the heat in the flues increased.

The second part of my invention relates to the disposition of the flue for directing the products of combustion from among the water-tubes in the main flue to the smoke-box by a mode of construction which at the same time facilitates the introduction and removal of the water-tubes for the purposes of repairs.

In the construction of tubular boilers heretofore secured to me by Letters Patent the rear ends of the horizontal part of the water-tubes have been secured to a single tube-sheet, and the products of combustion, after circulating among the tubes, have been deflected and carried by a flue at top or bottom around the edges of the tube-sheet to the smoke-box behind. This mode of construction has been found to be objectionable, for the reason that the deflection of the products of combustion prevents the heat from acting on the rear ends of the middle tubes, and the tube-sheet, being a single plate, required the tubes, when taken out for repairs, to be removed through the front or furnace door, which for that reason had to be located with special reference to the removal of the tubes.

To avoid the defects above enumerated, this part of my invention consists in making the back tube-sheet in two parts, or with a space cut out in the middle to form a flue-space leading from the middle of the group of tubes to the smoke-box behind. By this means the products of combustion will have a more direct action on the rear ends of the tubes, and the middle flue-space leading to the smoke-box will facilitate the removal of the water-tubes.

The third part of my invention relates to the arrangement of the bent-up ends of the water-tubes where they are connected with the crown-plate of the furnace. As the water-tubes are curved or bent up at their forward end, the inner ones of the series cannot be taken out and replaced for the purpose of repairs unless the spaces between them be greater than their diameter. To place the tubes all at a distance apart greater than their external diameter would make the amount of heating-surface too small for the size to which locomotive or marine boilers are limited. Convenience for repairs requires the tubes to be far apart. The amount of steam required to be generated within a given size of locomotive-boiler requires them to be placed very near to each other, and the increased amount of flame and heated gases which will be evolved from the fire, by reason of the blast introduced under the construction mentioned as constituting the first part of my invention, will call for a greater amount of space between the tubes than when the combustion is only elicited by the draft, as heretofore usually induced in the furnaces of locomotives.

In view of these circumstances a necessity has arisen for a new arrangement of the forward end of the water-tubes, and to meet the circumstances above stated the third part of my invention consists in connecting the bent-up end of the water-tubes with the crown-sheet of the boiler in a series of double rows in the direction of the length of the boiler, placing the tubes constituting each double row very near to each other, and the double rows at a greater distance apart than the external diameter of the several tubes. In this way any tube when disconnected can be removed laterally to one of the wide spaces to be drawn out, the required amount of space is given for the increased volume of flame and heated gases, while at the same time a greater number of tubes can be put in a boiler of given size than if the spaces between the several tubes were greater than the external diameter of the tubes. The flame and gases passing up freely in the wide spaces will spread laterally, and thus act with nearly as good an effect as if wide spaces were left between all the rows of tubes.

The fourth part of my invention consists in interposing net-work or plate between the rear end of the flue and the smoke-stack and the exhaust-pipe, for the regulating of the escape of the products of combustion from the flue and the evolution of the gases and sparks in the smoke-box; and the last part of my invention consists in combining with a deflecting-surface in the smoke-box a receptacle for the sparks or fine particles of coal, so that an accumulation of sparks in the smoke-box shall not obstruct or interfere with the draft, or the consumption of the sparks upon the floor of the smoke-box shall not burn out the floor.

In the accompanying drawings, which represent a boiler having all the characteristic features described in Letters Patent granted to me by the United States, and bearing date the 16th day of July, 1850, *a* are the water-tubes, the bent-up ends of which are secured to the crown-sheet *b* of the furnace in a series of double rows in the direction of the length of the boiler, the spaces between the two single rows constituting the double rows being less than the external diameter of the tubes, and the spaces between the double rows being greater than the external diameter of the said tubes. When thus arranged it will be seen that the tubes of each single row can be taken out or inserted without difficulty through the wide space next to it, while at the same time the spaces between the several tubes constituting each double row may be made as narrow as desirable with the view to obtain a great amount of heating-surface within a boiler of limited size. The rear end of the tubes on one side of the boiler are secured to a tube-sheet, *d*, and the other half to another and corresponding tube-sheet, *d'*, on the other side. A space, *e*, is left between the two tube-sheets, in which space is formed a flue leading from the main flue *f* among the tubes to the smoke-box *g* behind, and forward of this flue there is a check or deflector, *g'*, placed in the middle space between the series of tubes, so that the products of combustion traveling rearward shall be deflected to the right and to the left among the tubes, and then back again among the tubes to reach the central flue leading to the smoke-box. In practice I have found that two checks or deflectors were more useful than one. In this way the heated gases have a full and efficient action on the tubes. A wire-gauzed net-work, *h*, or plate more or less perforated, is attached to the rear end of the flue and interposed between it and the smoke-stack and the usual exhaust-pipe *i* in the smoke-box. The sparks are thus deflected into the receptacle *e'*, the gases and products of combustion revolved, and the burning out of the bottom of the smoke-box prevented. It will be seen that by opening the usual door in the back of the smoke-box and taking out the wire-gauze at the rear end of the flue *e* a convenient space is obtained through which the water-tubes can be taken out and reinserted with facility without the necessity of locating the door of the furnace for special purpose of repairs, and which in some instances would be attended with serious difficulty.

The ash-pan *j* under the grate is constructed with a false bottom, *k*, of sheet metal, leaving an open space, *l*, between it and the main bottom *m*. This space or channel-way is left open at one end, *n*, which may be termed the "front" when the locomotive is moving forward, that air may be forced into the space *l* by the travel of the engine through the air, and as the air passes through this space it will be heated by the false bottom, which derives its heat by radiation from the fire on the grate above. The false bottom does not extend the whole length of the ash-pan, and an opening, *o*, is left at the rear end, through which the heated air is forced in an unbroken column into the ash-pan to blow the fire on the grate. In this way an efficient blast of heated air is produced to blow the fire by the mere forward motion of the locomotive.

As a modification of the construction of the ash-pan herein described, the grate-bars *p* are made hollow and open at each end, the front end to receive air by the travel of the locomotive through the air, and the other end opening into the ash-pan for the discharge of the air, which is thus forced through each grate-bar in an unbroken column and discharged into the ash-pan to excite the fire.

The admission of the blast in an unbroken column or columns through the channel-way under the false bottom of the ash-pan or through the hollow grate-bars, or either, in contradistinction to introducing the air directly into the ash-pan through an aperture in front, effectually prevents eddies in the ash-pan, which is known frequently to force portions of fire out of the aperture through which the air enters. The aperture or passage between the main and false bottom should be provided with a damper, *r*, to regulate the blast or to shut off, at the pleasure of the engineer. Back of the fire-chamber a hole, *s*, is made in the bottom of the main flue, to which is fitted a cylindrical or other shaped receptacle, *t*, having a bottom pierced with small holes *u*, and back of the tubes and flue is another receptacle, *e'*. These receptacles can be lined inside with fire-clay or other refractory substance, or protected from heat by surrounding water. Just back of the receptacle *t* there is a check or deflector, *v*, in the main flue. As the gaseous products of combustion are impelled from the fire-chamber through the main flue they are checked and deflected to the right and left by the deflector *v*. This checks the momentum of the small particles of coal which are carried out of the fire-chamber by the force of the current, and, being checked, they fall in the receptacle and are there consumed. When they fall in the receptacle, they are in a highly-heated state, and some of them in a state of ignition, and, being supplied with air through the small apertures in the bottom of the receptacle, combustion continues until they are entirely consumed. In this way the flues are prevented from being choked by the accumulation of solid particles of coal, and heat is evolved from fuel which would otherwise be wasted. If the supply of air be too great, the particles of coal will be cooled below the point of ignition, and in a short time the receptacle will be filled with solid particles of coal, which, if not removed, will permit the evil to go on that is so desirable to avoid.

What I claim as my invention, and desire to secure by Letters Patent in the construction of a steam-boiler, is—

1. The arrangement of the tubes and the connection of one or more receptacles, substantially such as herein described, for consuming the fine particles of coal which are carried by the force of the blast or draft from the fire-chamber into the flues, the said receptacle being placed below the bottom of the main flue and communicating therewith, and between the fire-chamber and a check or deflector, or between checks and deflectors, in the main flue to check the momentum of the particles of coal and cause them to drop into the receptacle, to be consumed, substantially as described.

2. In the construction of the boiler substantially as herein described, forming a single flue in the middle for the passage of the products of combustion from the main flue surrounding the water-tubes to the smoke-box, when this is connected with a check or deflector placed in the main flue among the water-tubes and in front of the said middle flue, substantially as described, to prevent the products of combustion from taking a direct course to the said middle flue, as described.

3. Arranging the bent-up ends of the water-tubes where they are connected with the crown-sheet of the furnace in a series of double longitudinal rows, and leaving spaces between the double rows of greater width than the external diameter of the water-tubes, substantially as described, to admit of taking out and inserting the tubes, while in other respects the said tubes may be placed as near to each other as may be desired.

4. Interposing the net-work or plate between the rear end of the flue and the smoke-stack and the exhaust-pipe, as and for the purposes herein set forth.

5. Combining with the deflector in the smoke-box the receptacle for the sparks or fine particles of coal-dust, substantially as herein described, for preventing the sparks from being consumed or accumulating in the smoke-box and interfering with the draft, as herein set forth.

F. P. DIMPFEL.

Witnesses:
THOMPSON BLACK,
HUGH MCAFEE.